No. 685,169. Patented Oct. 22, 1901.
W. PAUL.
AIR VALVE FOR WATER COCKS.
(Application filed Jan. 29, 1901.)
(No Model.)
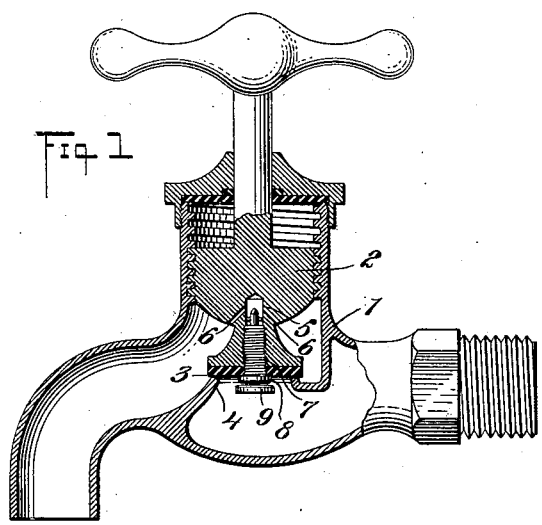
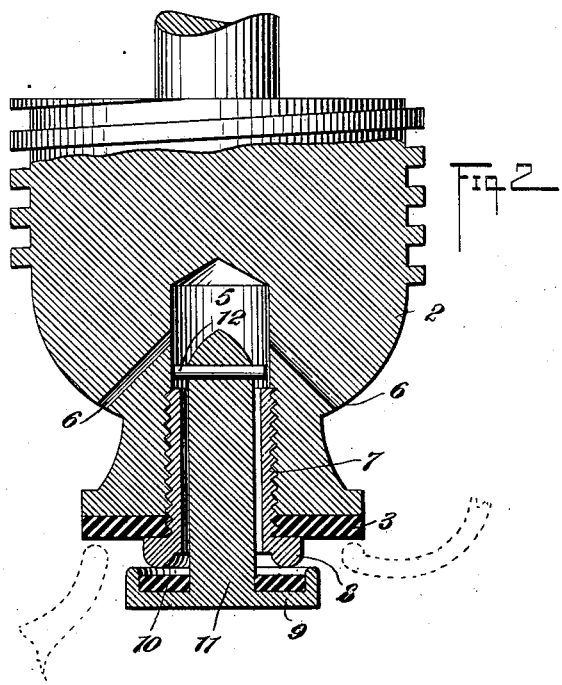
WITNESSES:
INVENTOR
William Paul
BY
ATTORNEYS

UNITED STATES PATENT OFFICE.

WILLIAM PAUL, OF SAVANNAH, GEORGIA.

AIR-VALVE FOR WATER-COCKS.

SPECIFICATION forming part of Letters Patent No. 685,169, dated October 22, 1901.

Application filed January 29, 1901. Serial No. 45,199. (No model.)

*To all whom it may concern:*

Be it known that I, WILLIAM PAUL, a citizen of the United States, and a resident of Savannah, in the county of Chatham and State of Georgia, have invented a new and Improved Air-Valve for Water-Cocks, of which the following is a full, clear, and exact description.

This invention relates to improvements in air-valves for water-cocks; and the object is to provide, in connection with a water-cock, an air-inlet-controlling valve held normally in closed position by water-pressure, but automatically opening upon opening the drain-cock to permit the entrance of air to cause a thorough draining of the pipe in freezing weather.

I will describe an air-valve for water-cocks embodying my invention and then point out the novel features in the appended claims.

Reference is to be had to the accompanying drawings, forming a part of this specification, in which similar characters of reference indicate corresponding parts in both figures.

Figure 1 is a sectional view of a water-cock, showing a valve embodying my invention as applied thereto; and Fig. 2 is a section, on an enlarged scale, of the water-cock-valve plug and the air-controlling valve.

Referring to the drawings, 1 designates a water-cock, and 2 a screw-plug valve operating therein and having a packing 3 at its lower end for engaging with the valve-seat 4. This valve-plug 2 has a vertical opening 5, from which air-ports 6 lead. Having screw-thread engagement with this opening 5 is a sleeve 7, the lower end of which is provided with a valve-seat 8 for receiving a valve 9, which, as shown in Fig. 2, is made cup-shaped, and inserted in the cup is a packing 10. The stem 11 of the valve passes loosely through the sleeve 7, so that air may freely pass between said stem and the interior surface of the sleeve. The valve is guided in its vertical movement by means, as here shown, of a pin 12, extending through the upper portion of the stem and engaging at its ends with the wall of the opening 5.

In operation the water-pressure when the plug-valve is closed will hold the valve 9 closely against its seat, preventing the escape of water. When, however, it is desired to drain a pipe, upon opening the drain-cock of the pipe the pressure of course will be relieved and the valve will fall by gravity, so that air may pass through the ports 6 and into the supply-pipe, causing all the water to discharge therefrom.

Having thus described my invention, I claim as new and desire to secure by Letters Patent—

1. A water-cock, a plug-valve operating therein, the said plug-valve having a vertical opening with which an air-port communicates, a sleeve having screw-thread engagement in said opening and having a valve-seat at its lower end, a valve for engaging with said seat, a stem extended from the valve loosely through said sleeve, and a guide on the inner end of said valve-stem, substantially as specified.

2. A water-cock, a valve operating therein for controlling the water, the said valve having a vertical opening and provided with air-ports communicating with said opening, a sleeve screwing into said opening and having a valve-seat at its outer end, a cup-shaped valve for engaging said seat and provided with a packing, the said cup-shaped valve having a stem passing loosely through said sleeve and extending beyond the inner end thereof, and a pin extending through the inner end of the stem and serving as a guide for the said valve, the said pin being adapted to rest on the inner end of the sleeve when the valve moves from its seat, as set forth.

In testimony whereof I have signed my name to this specification in the presence of two subscribing witnesses.

WILLIAM PAUL.

Witnesses:
W. G. WOODFIN,
J. L. MURPHY.